UNITED STATES PATENT OFFICE.

NATHAN SULZBERGER, OF NEW YORK, N. Y.

PROCESS OF REDUCTION BY MEANS OF HYDRAZIN OR THE LIKE.

1,164,141.     Specification of Letters Patent.     Patented Dec. 14, 1915.

No Drawing.     Application filed December 10, 1914. Serial No. 876,494.

*To all whom it may concern:*

Be it known that I, NATHAN SULZBERGER, born in New York city and a citizen of the United States, resident of New York city, in the county and State of New York, have invented new and useful Improvements in Processes of Reduction by Means of Hydrazin or the like, of which the following is a specification.

Hydrazin in particular, as well as other compounds of nitrogen containing hydrogen (as for instance hydroxylamin) and possessing reducing properties, can not in certain cases be used as reducing agents. I have found, that, in many of these instances, however the reducing properties of hydrazin, etc., can be increased or made to exert themselves, if certain metal compounds, even in very small amounts, are added. As such metals I have found those belonging to the platinum group especially valuable, which group, as is well known, includes the metals: osmium, iridium, platinum, ruthenium, rhodium and palladium. Other metals and their salts may also be employed as for instance: sulfate of copper, chlorid of gold, etc.

In the following I give, as an example of my novel process, the reduction of nickel-borate by means of hydrazin-hydrate, it being however distinctly understood, that I wish in no wise to limit myself to the given quantities or to the working method specifically stated and here employed.

Nickel-borate, representing a greenish powder insoluble in water, does not, even when heated in water containing hydrazin-hydrate undergo any visible change. Thus even when its suspension is boiled there seems to be no evolution of gas, due to the decomposition of the hydrazin. This fact by itself shows that the reducing qualities of the hydrazin are not exerted. If however to the suspension of the nickel-borate in water a very small amount (often times even only a trace) of, for example, a solution containing palladium-ammonium-proto-chlorid is added, and then the liquid containing hydrazin (or a salt of hydrazin, as, for instance, sulfate of hydrazin and an alkali), the evolution of hydrogen-gas soon becomes visible. This evolution of gas becomes very violent, particularly on heating, while the nickel-borate changes its color, darkening and finally precipitates practically all its nickel-content in consequence of the reducing action of the hydrazin, which action has been "incited" by the addition of the palladium-metal.

In one instance to a suspension of two grams of nickel-borate in about ten cc. of water, containing a few cc. of a solution of one part of palladium-ammonium-proto-chlorid in about one thousand parts of water, were added four grams of hydrazin-sulfate, which had been made alkaline by the addition of caustic soda. On heating a very violent evolution of gas was observed, while the suspended borate of nickel darkened in color. After ten to fifteen minutes the nickel-metal had deposited itself as a black, voluminous, spongy mass, while the liquid above the same had become waterlike clear. This nickel possesses very marked magnetic properties and is particularly valuable also in hydrogenating fats and oils, as for instance cottonseed-oil. A sample of cottonseed-oil, which was hardened with the above nickel-metal, proved to be particularly white in color and the nickel (the "catalyzer") had settled out of the oil at the end of the hydrogenization in the bottom of the test-tube so well, that the hot oil stood over the catalyzer as a clear liquid. During the process however the oil was black due to the very minute and fine suspension of the nickel in the same. The presence of the small amounts of that most efficient catalyzer palladium makes this nickel especially valuable for such a catalytic process. Similarly also other salts of nickel, cobalt, etc., may be reduced by the action of a liquid containing hydrazin with the addition of an "inciting" metal (or a mixture of such metals), among which may be such salts, as for instance nickel-nitrate, which are soluble in water, as well as such, as for instance nickel-silicate (nickel-carbonate, cobalt-carbonate, etc., which, being insoluble in water, are only suspended in the same. Even nitrate of nickel, which, although easily soluble in water, can not be reduced by a solution containing hydrazin, even when heated with the same, can readily be reduced, if the hydrazin is used in connection with a metal, which "incites" its action, as for instance platinum-chlorid.

The above described working methods can variously be modified without leaving the scope of this invention. Thus the borate of nickel can also be reduced with hydrazin-hydrate, using as an "inciter" platinum-chlorid. The "inciting" metal-salt may also be added to the borate simultaneously with the hydrazin-containing liquid. I prefer in many cases to add the hydrazin to the liquid containing the compound, which is to be reduced, and the inciting metal.

The process may also be of special technical value in the metallurgical separation of nickel, etc., from other products. As basic compounds of nitrogen and hydrogen principally to be considered are hydrazin, (hydrazin-hydrate, salts of hydrazin with an alkali) and hydroxylamin (salts plus alkali) and derivatives, the value as reducing agents of which is increased or started by the addition of metals.

Claims:

1. Process for reducing metal-compounds, which are practically unreducible with nitrogen-hydrogen-compounds possessing reducing-action alone, consisting in treating such metal-compounds with such nitrogen-hydrogen-compounds in the presence of a catalytically acting metal.

2. The process of reducing reducible metal-compounds which comprises treating the said compounds with basic nitrogen-hydrogen connections possessing reducing action, in the presence of another catalytically acting metal.

3. The process of reducing reducible metal-compounds which comprises treating the said compounds with basic nitrogen-hydrogen connections possessing reducing action, in the presence of a catalytically acting metal belonging to the platinum group.

4. Process for reducing metal-compounds by means of hydrazin, consisting in increasing the action of such hydrazin as a reducing agent by treating said metal-compounds with hydrazin in the presence of a catalytically acting metal.

5. The process of reducing reducible metal-compounds which comprises treating the said compounds with hydrazin, in the presence of another catalytically acting metal.

6. Process for reducing metal-compounds, which practically can not be reduced with hydrazin alone, which comprises treating the said compounds with hydrazin in the presence of a catalytically acting metal belonging to the platinum group.

7. Process for reducing metal-compounds, which practically can not be reduced with hydrazin alone, which comprises treating the said compounds with hydrazin in the presence of palladium.

8. The process of reducing nickel-compounds which comprises treating the same with hydrazin in the presence of a catalytically acting metal.

9. The process of reducing nickel-compounds which comprises treating the said compounds with hydrazin, in the presence of palladium.

NATHAN SULZBERGER.

Witnesses:
CHARLES FISHER,
O. N. ROCKER.